(12) United States Patent
Files et al.

(10) Patent No.: US 10,742,042 B2
(45) Date of Patent: Aug. 11, 2020

(54) DUAL SYSTEM HYBRID CHARGER MANAGEMENT

(71) Applicant: Dell Products, L.P., Round Rock, TX (US)

(72) Inventors: Jace W. Files, Round Rock, TX (US); Gerald Rene Pelissier, Mendham, NJ (US); Lawrence Liu, Taipei (TW)

(73) Assignee: Dell Products, L.P., Round Rock, TX (US)

( * ) Notice: Subject to any disclaimer, the term of this patent is extended or adjusted under 35 U.S.C. 154(b) by 77 days.

(21) Appl. No.: 16/196,873

(22) Filed: Nov. 20, 2018

(65) Prior Publication Data

US 2020/0161872 A1    May 21, 2020

(51) Int. Cl.
*H02J 7/00* (2006.01)
*H01M 10/42* (2006.01)

(52) U.S. Cl.
CPC ........ *H02J 7/00036* (2020.01); *H02J 7/0042* (2013.01); *H02J 7/0068* (2013.01); *H01M 10/4257* (2013.01)

(58) Field of Classification Search
CPC ........ H02J 7/025; H01F 38/14; Y02T 90/122; B60L 11/182; Y02E 60/12
See application file for complete search history.

(56) References Cited

U.S. PATENT DOCUMENTS

| | | | |
|---|---|---|---|
| 9,887,571 B1 | 2/2018 | Sultenfuss et al. | |
| 2010/0115303 A1* | 5/2010 | Stedman | G06F 1/3203 |
| | | | 713/320 |
| 2016/0336572 A1* | 11/2016 | Yoshida | H01M 10/482 |
| 2017/0012448 A1* | 1/2017 | Miller | H02J 7/007 |
| 2017/0207637 A1* | 7/2017 | Sugeno | H02J 3/32 |
| 2017/0297446 A1* | 10/2017 | Namba | H04B 3/56 |
| 2019/0006723 A1* | 1/2019 | Martin | G01R 31/396 |
| 2019/0229376 A1* | 7/2019 | Petrakivskyi | H01M 10/482 |

* cited by examiner

*Primary Examiner* — Arun C Williams
(74) *Attorney, Agent, or Firm* — Fogarty LLP (57) ABSTRACT

An IHS (Information Handling System) may support multiple power sources and may support concurrent voltage inputs from each of these multiple power sources. An IHS may include multiple batteries, each of which is charged by a separate battery charging system. Embodiments of systems for charging and powering such IHSs are described, where such embodiments maximize the power that may be drawn from such concurrent power sources inputs, while avoiding inefficient modes of operation and while avoiding dead battery conditions. In many IHSs, certain power source couplings may also be configured to draw power from the IHS, such as Type C USB couplings. Embodiments also support efficient power supply outputs that avoid excessive battery depletion that may result in dead battery states.

20 Claims, 9 Drawing Sheets

DUAL SYSTEM HYBRID CHARGER MANAGEMENT

FIELD

This disclosure relates generally to Information Handling Systems (IHSs), and more specifically, to powering and charging IHSs.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An IHS may support multiple systems for powering and charging the batteries of the IHS. In some instances, an IHS may include multiple rechargeable batteries from which the IHS may be powered. For instance, certain portable IHSs, such as dual-screen laptop computers and 2-in-1 convertible laptop computers, may include two separate batteries, each with its own charging system. Accordingly, such IHSs may also include multiple options for powering the IHS and charging the separate battery systems. For instance, an IHS may support both wireless charging and multiple wired charging inputs.

SUMMARY

Various Information Handling System (IHS) embodiments are described herein. The IHS embodiments include, a first battery system; a second battery system; a first power coupling; a second power coupling; and a power path multiplexer connected to the first power coupling and the second power coupling, wherein the power path multiplexer is configured to: route power inputs received concurrently via the first power coupling and the second power coupling for charging the first battery system or the second battery system; and route power inputs received via the first power coupling for powering a device connected to the second power coupling.

In certain additional IHS embodiments, the first battery system comprises a rechargeable first battery and a first battery charger and wherein the second battery system comprises a rechargeable second battery and a second battery charger. In certain additional IHS embodiments, the power path multiplexer is further configured to route power inputs received concurrently via the first power coupling and the second power coupling for charging the lowest charged of the first battery and the second battery. In certain additional IHS embodiments, the first power coupling provides a wireless charging power input to the power path multiplexer. In certain additional IHS embodiments, the second power coupling comprises a wired power coupling operable to provide a power input to the power path multiplexer or to draw a power output provided by the power path multiplexer. In certain additional IHS embodiments, the first battery system is comprised within a chassis base portion of the IHS. In certain additional IHS embodiments, the second battery system is comprised within a display portion of the IHS. In certain additional embodiments, the IHS further includes an embedded controller operable to: detect a voltage input available via the first power coupling; detect a voltage output request via the second power coupling; configure the power path multiplexer to route the first power coupling voltage input to the second power coupling.

In various additional embodiments, methods are described for managing power inputs available to an Information Handling System (IHS). The methods include receiving a first power input via a first power coupling to the IHS; receiving, concurrent with the first power input, a second power input via a second power coupling to the IHS; routing, by a power path multiplexer of the IHS, the first power input and the second power input for charging a first battery system of the IHS or for charging a second battery system of the IHS; and routing, by the power path multiplexer, the first power input for powering a device connected to the second power coupling.

In certain additional method embodiments, the first battery system comprises a rechargeable first battery and a first battery charger and wherein the second battery system comprises a rechargeable second battery and a second battery charger. In certain additional method embodiments, the concurrently received power inputs are routed by the power path multiplexer for charging the lowest charged of the first battery and the second battery. In certain additional method embodiments, the first power coupling provides a wireless charging power input to the power path multiplexer. In certain additional method embodiments, the second power coupling comprises a wired power coupling operable to provide a power input to the power path multiplexer or to draw a power output provided by the power path multiplexer. In certain additional method embodiments, the first battery system is comprised within a chassis base portion of the IHS. In certain additional method embodiments, the second battery system is comprised within a display portion of the IHS. In certain additional embodiments, the methods further include: detecting, by an embedded controller of the IHS, a voltage input available via the first power coupling; detecting, by the embedded controller, a voltage output request via the second power coupling; and configuring, by the embedded controller, the power path multiplexer to route the first power coupling voltage input to the second power coupling.

In various additional embodiments, systems are described for powering and charging an Information Handling System (IHS). The systems include: a multi-cell battery comprising a plurality of cells, wherein a first portion of the plurality of cells are configured for charging via a first charger of the IHS and a second portion of the plurality of cells are configured for charging via a second charger of the IHS; a first power coupling; a second power coupling; and a power path multiplexer connected to the first power coupling and the second power coupling, wherein the power path multiplexer is configured to: route power inputs received concurrently via the first power coupling and the second power coupling for charging the first portion of the plurality of battery cells or for charging the second portion of the plurality of battery cells; and route power inputs received via the first power coupling for powering a device connected to the second power coupling.

In certain additional system embodiments, the power path multiplexer is further configured to route power inputs received concurrently via the first power coupling and the second power coupling for charging the lowest charged of the first portion of the plurality of battery cells and the second portion of the plurality of battery cells. In certain additional system embodiments, the first power coupling provides a wireless charging power input to the power path multiplexer. In certain additional system embodiments, the second power coupling comprises a wired power coupling operable to provide a power input to the power path multiplexer or to draw a power output provided by the power path multiplexer.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

As described above, an IHS may support multiple power sources and may support concurrent voltage inputs from each of these multiple power sources. Also as described, an IHS may include multiple batteries, each of which is charged by a separate battery charging system. Embodiments of systems for charging and powering such IHSs are described, where such embodiments maximize the power that may be drawn from such concurrent power sources inputs, while avoiding inefficient modes of operation. In many IHSs, certain power source couplings may also be configured to draw power from the IHS, such as Type C USB couplings. Embodiments also support efficient power supply outputs that avoid excessive battery depletion that may result in dead battery states.

Figure 1:
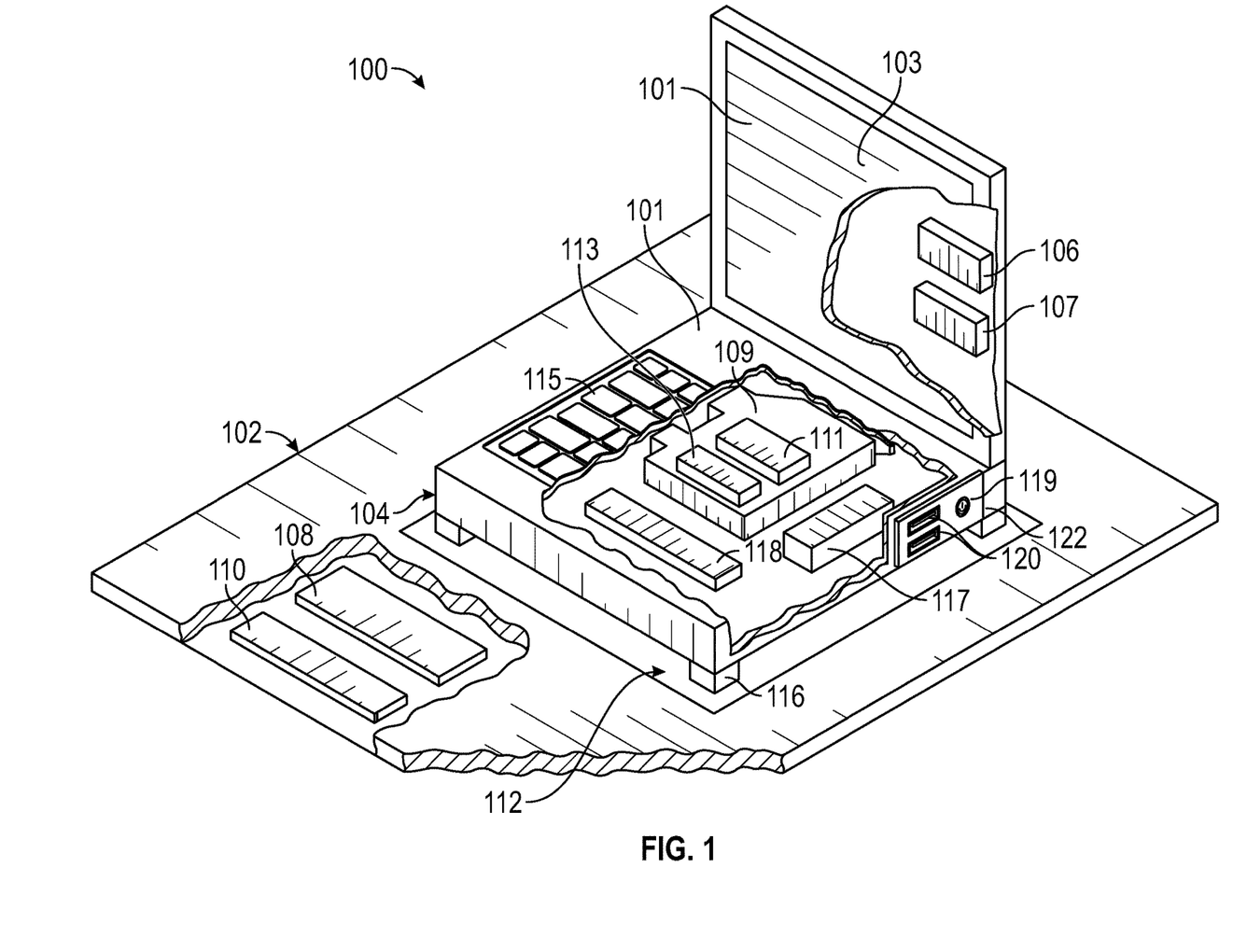
FIG. 1 is a diagram illustrating certain components of a system for charging and powering an IHS including two batteries and two separate battery charging systems.

FIG. 1 is an illustration depicting certain components of a wireless charging system 100 for charging and powering an IHS 101 that includes two batteries and two separate battery charging systems. In certain embodiments, IHS 101 may be a "2-in-1" portable computer, where the 2-in-1 includes a display portion 103, such as a touchscreen, and a chassis base 104. In the illustrated embodiment, the chassis base 104 houses the main hardware of the 2-in-1 IHS 101, such as the motherboard, processor(s), storage drives, system memory and the various non-display sub-systems utilized by the 2-in-1 IHS 101. The chassis base 104 may also support a keyboard 115 that may be permanently incorporated into the chassis base 104. In certain embodiments, keyboard 115 may instead be removably connected to the chassis base 104 of the IHS 101.

Instead of a mechanical keyboard being incorporated into the chassis base 104, in certain other embodiments, the chassis base 104 and display portion 103 of IHS 101 may both include displays. Both such displays may be touchscreen displays configured to detect finger gesture and stylus inputs. In such embodiments where a touchscreen display is incorporated into the chassis base 104, a soft keyboard may be displayed within this touchscreen display and used to operate IHS 101. In certain embodiments, a physical keyboard may also be wirelessly coupled to the IHS 101 and used to operate IHS 101.

As illustrated, the IHS 101 of wireless charging system 100 may be charged via a wireless charging pad 102 that transfers energy to a wireless charging module 109 of IHS 101, such as via an inductive coupling. As described in additional detail below, the transferred energy may then be selectively utilized to charge one or both of the batteries of the IHS 101 and/or to power a device coupled to IHS 101 via a wired connection. In various embodiments, wireless charging pad 102 may utilize different power transfer technologies in addition to or instead of inductive coupling, such as resonant inductive coupling, capacitive coupling and beamed power transfer, such as laser or microwave transfer.

In the illustrated embodiment, wireless charging pad 102 includes a power source 108, a coil 110, and a landing pad 112. In certain embodiments, power source 108 may receive a AC power input and may thus include a DC converter and a voltage regulator by which a regulated DC voltage may be supplied to coil 110 of the charging pad 102. The coil 110 utilizes the power source 108 input to generate a transfer voltage in a manner that induces a corresponding voltage in a coil element 113 of a wireless charging module 109 of the IHS. In FIG. 1, coil 110 is located near the edge of charging pad 102 for purposes of illustration. In embodiments, coil element 110 may be located near the center of landing pad 112 on which IHS 101 is placed in order to properly align the coil element 110 of the charging pad 102 and the coil element 113 of the IHS 101.

The landing pad 112 portion of the charging pad 102 on which IHS 101 must be placed, and properly oriented within the landing pad 112, in order for the coil elements to be properly aligned. As illustrated, the chassis base 104 of IHS 101 includes spacers 116 that create an air gap between the bottom surface of IHS 101 and charging pad 102, thus promoting efficient transfer of power from the coil 110 of the charging pad and the coil 113 of the IHS 101. The voltage generated by the coil 113 of the IHS 101 may then be received by a voltage regulator 111 that interfaces with the power and charging system described below.

As illustrated, the chassis base 104 may include a power port 119 that may receive a DC input voltage. The chassis base 104 may also include various USB Type C connectors 120 that may each receive a USB cable for coupling a variety of devices to the IHS 101. The Type C connectors 120 may support two-way power transfer such that IHS 101 can alternately receive power from or transfer power to an external device coupled to the Type C connectors 120 through USB cables. The IHS may utilize one or more USB controllers that perform handshake procedures with devices connected to the Type C connectors 120 in order to determine the appropriate direction of transfer and the voltage levels to be transferred via the coupling.

The power inputs available from the DC power port 119, the Type C connectors 120, and the wireless charging pad 102 may be utilized according to various embodiments to operate the IHS 101 and to charge separate batteries housed within the chassis base 104 and the display portion 103 of the IHS. In various embodiments, each separate battery supported by the IHS may be charged by a separate battery charger. For instance, in FIG. 1, battery 118 housed within the chassis base 104 is charged by battery charger 118 and battery 107 housed within the display portion 103 is charged by battery charger 106. As described in additional detail with regard to the below embodiments, a power path multiplexer may be utilized to route power from the available inputs, including concurrent power inputs, to the battery chargers 106 and 118.

Figure 2A:
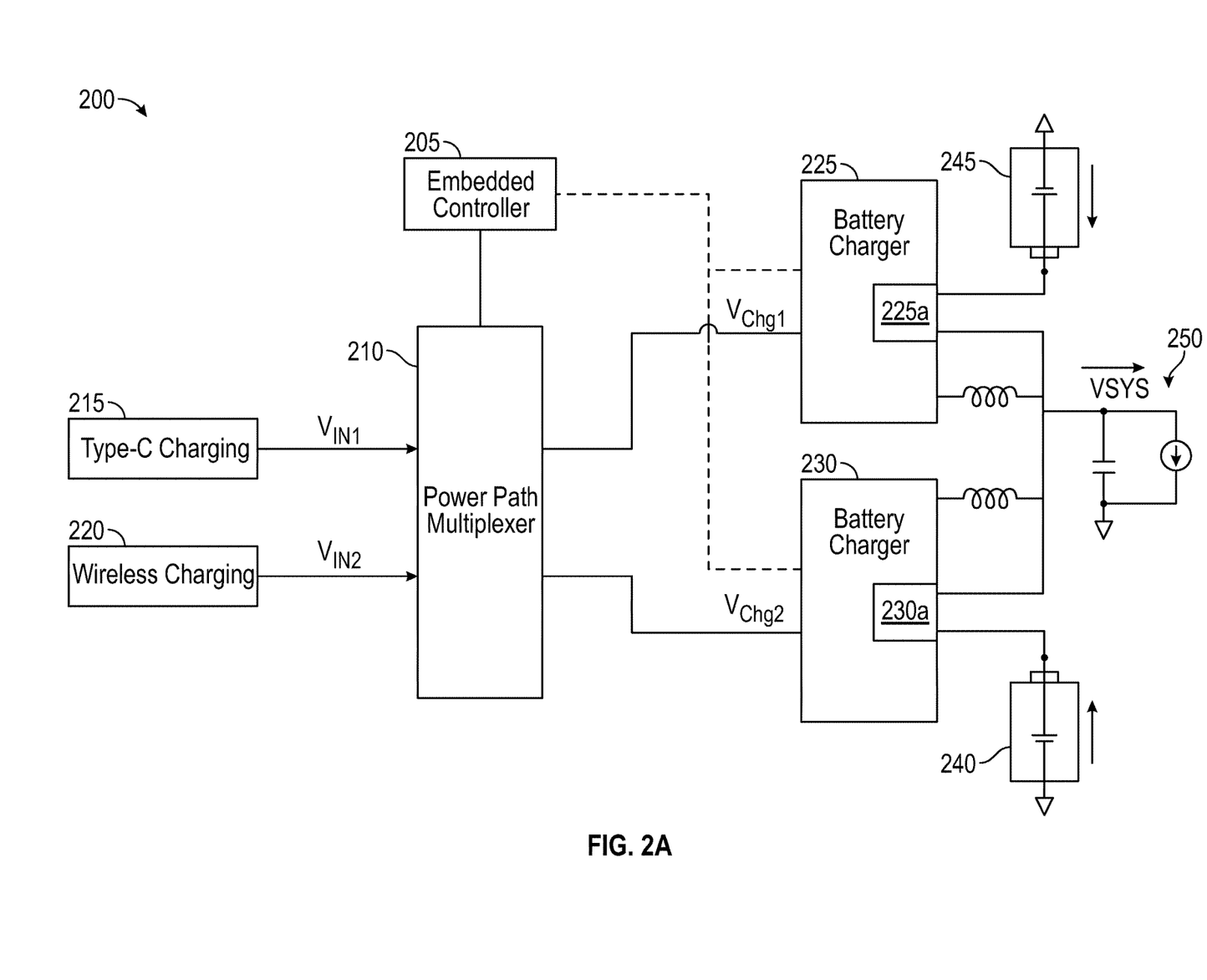
FIG. 2a is a block diagram illustrating certain components of a system in a first configuration for charging and powering an IHS that includes two batteries and two separate battery charging systems.

FIG. 2a is a block diagram illustrating certain components of a system 200 for charging and powering an IHS that includes two batteries and two separate battery charging systems, such as IHS 101 of FIG. 1. As illustrated in FIG. 2a, system 200 includes a first battery charger 225 that charges a first battery 245, such as battery 118 and charger 117 incorporated into the chassis base 104 of FIG. 1. Also as illustrated in FIG. 2a, system 200 includes a second battery charger 230 that charges a second battery 240, such as battery 107 and charger 106 incorporated in the display portion 103 of IHS 101.

As illustrated, the charging and power system 200 includes two power couplings. One power coupling available in system 200 is wireless charging system 220, such as the wireless charging system 100 described regard to FIG. 1. A second power coupling available in system 200 is a Type C power connection 215, such as the USB Type C connectors 120 by which devices may be coupled to an IHS. As a Type C power connection, devices coupled to the charging and power system 200 via the Type C connection 215 may alternatively provide power to the system 200 or may draw power from the system 200. In certain embodiments, the Type C power connection 215 includes a controller, such as a USB controller, that configures the Type C connection as providing or drawing power from system 200, and also configures the voltage and current parameters for the power transfer via the Type C connection 215.

The two power couplings 215, 220 of system 200 are received by a power path multiplexer 210. As described in additional detail below, power path multiplexer 210 may be configured based on commands provided by embedded controller 205 to connect the power couplings 215, 220 to the battery chargers 225, 230 in order to either charge or draw power from batteries 240, 245. As described with regard to FIG. 1, an IHS may also include a DC power input 119 that is power the IHS and to charge batteries of the IHS. In certain embodiments, a DC power input may be an additional power coupling that may be routed by power path multiplexer 210 along with the wireless charging 220 and Type C charging 215 power couplings. In other embodiments, a DC power input may replace the wireless charging coupling 220 to the power path multiplexer 210.

In FIG. 2a, the power path multiplexer 210 is neither receiving nor providing power via any of the available power couplings 215, 220. Accordingly, the power path multiplexer 210 does not connect either power coupling 215, 220 to either of the battery chargers 225, 230. In certain embodiments, the embedded controller 205 interfaces with controllers for each of the power couplings 215, 220 in order to determine that no power is available via the wireless power coupling 220 and that a power draw is not being requested via an external device connected to the Type C power coupling 215.

With no power transfers being made by either power coupling 215, 220, the embedded controller 205 configures each of the battery chargers 225 and 230 to discharge batteries 245 and 240, respectively, as a source of system power 250. In certain embodiments, voltage regulators 225a and 230a in each of the battery chargers 225 and 230 are configured to draw the appropriate voltages from each of the batteries 240 and 245 for supplying the required system voltage 250. In such a configuration, the system power 250 will draw voltage from each of the batteries 240 and 245 until both batteries have been fully discharged.

Figure 2B:
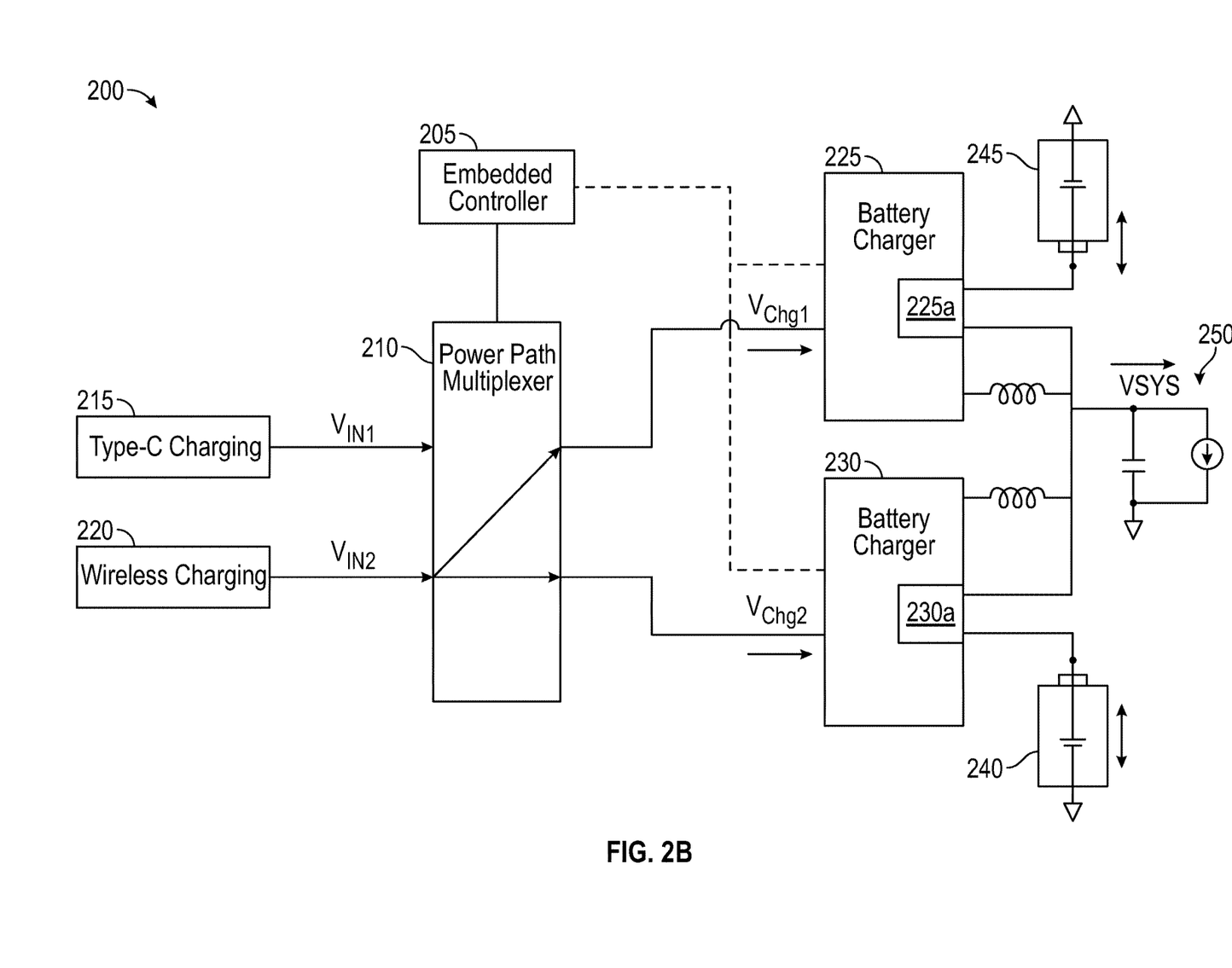
FIG. 2b is a block diagram illustrating certain components of a system in a second configuration for charging and powering an IHS that includes two batteries and two separate battery charging systems.
Figure 2C:
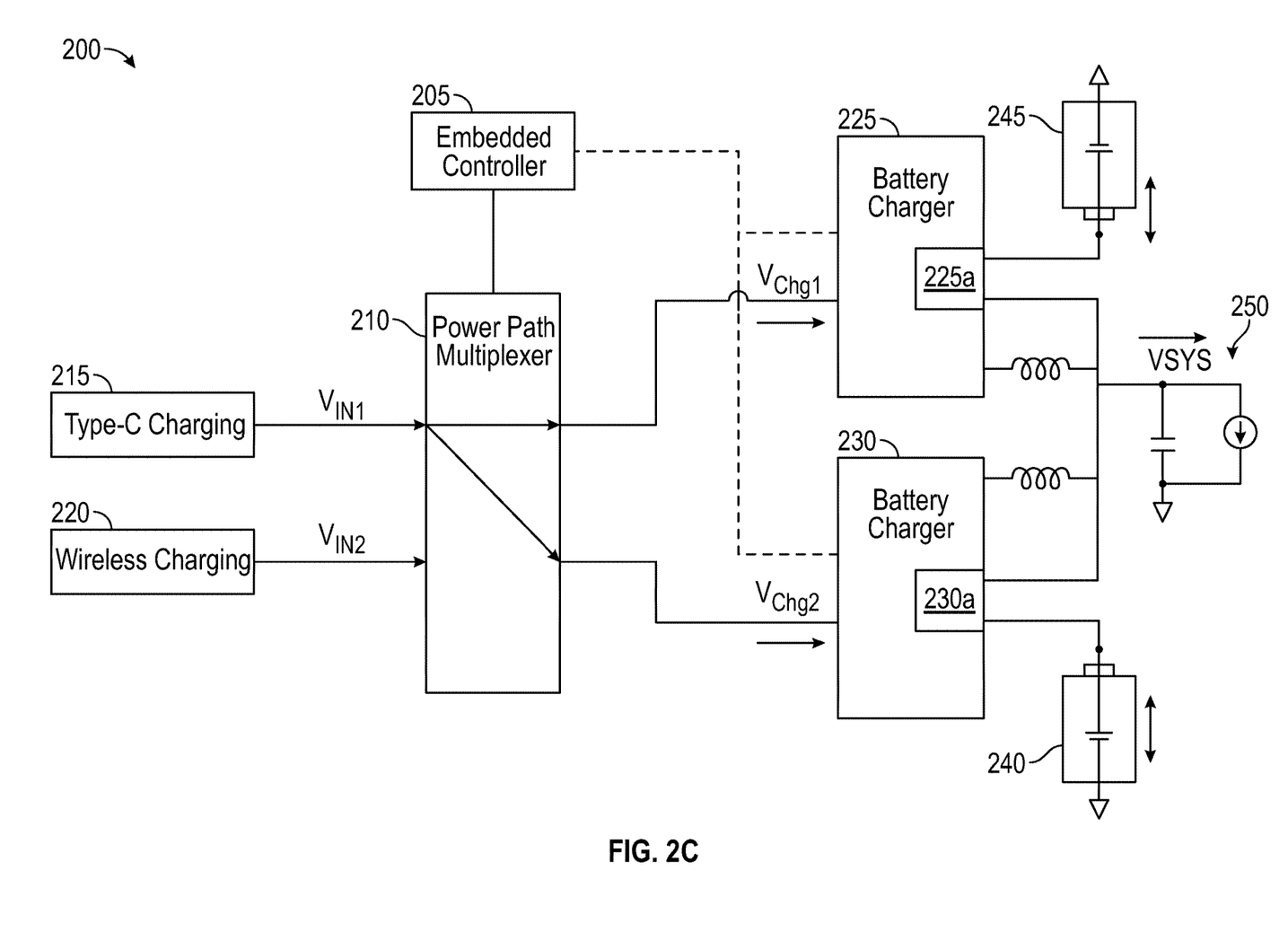
FIG. 2c is a block diagram illustrating certain components of a system in a third configuration for charging and powering an IHS that includes two batteries and two separate battery charging systems.
Figure 2D:
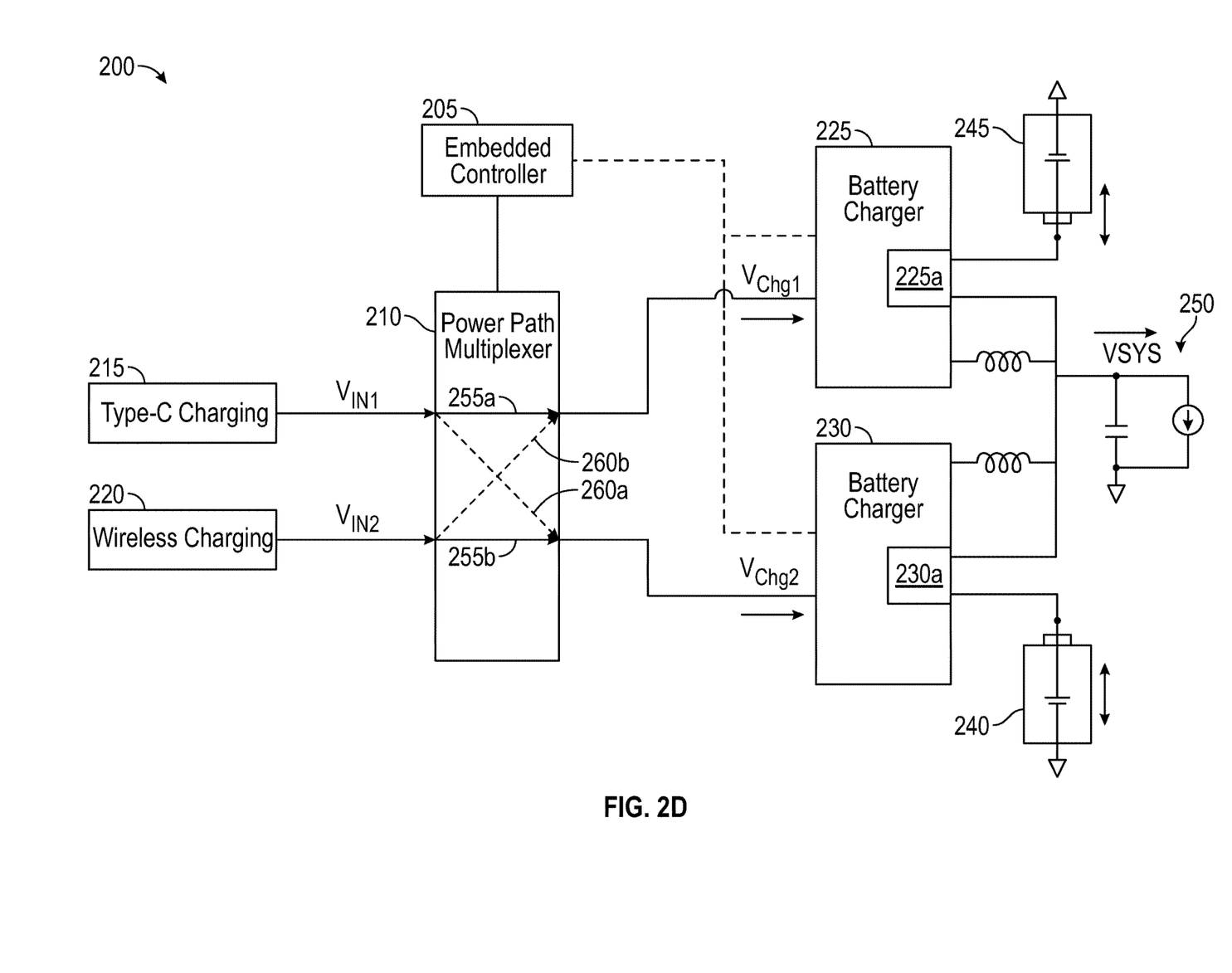
FIG. 2d is a block diagram illustrating certain components of a system in a fourth configuration for charging and powering an IHS that includes two batteries and two separate battery charging systems.
Figure 2E:
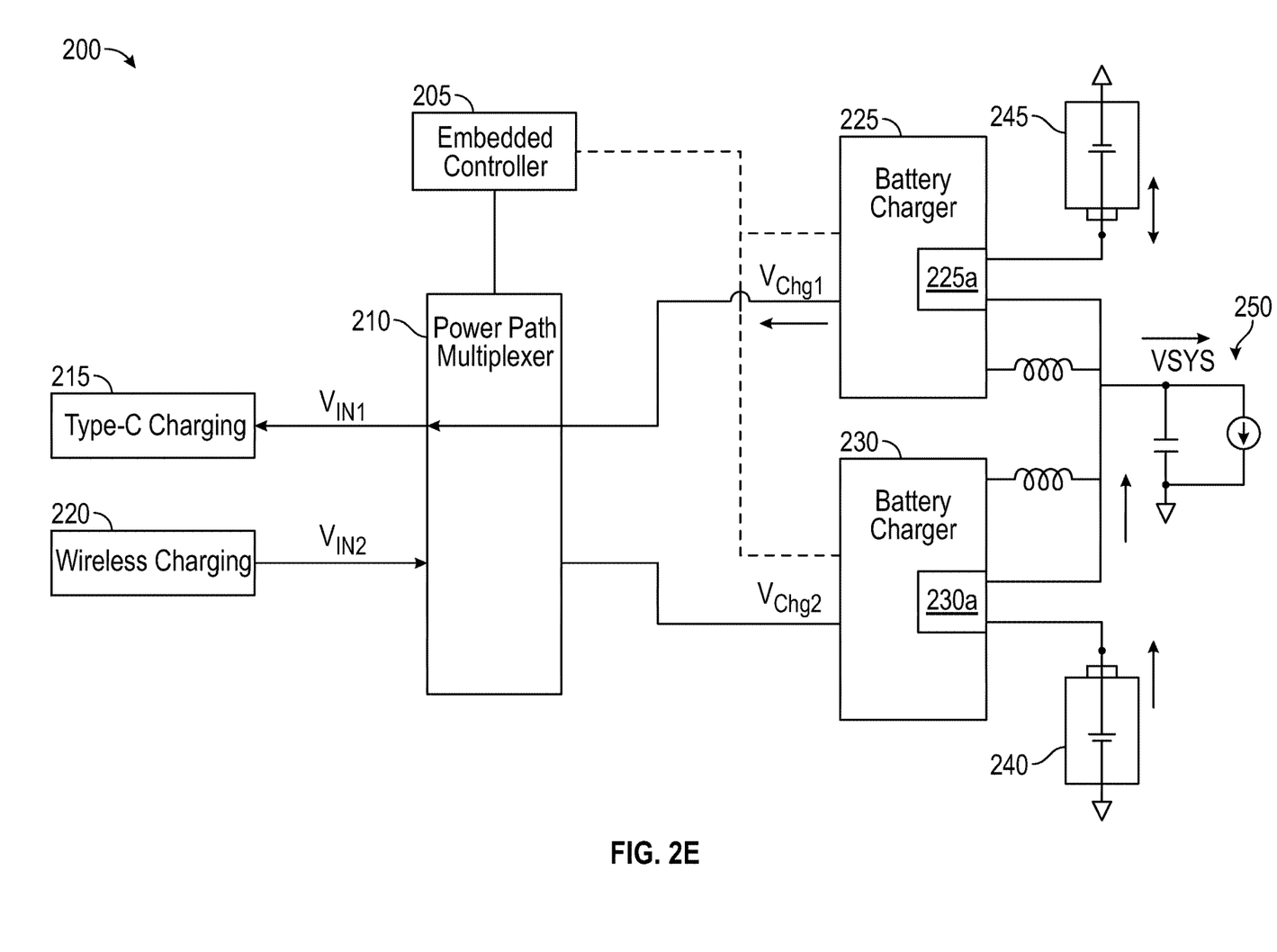
FIG. 2e is a block diagram illustrating certain components of a system in a fifth configuration for charging and powering an IHS that includes two batteries and two separate battery charging systems.
Figure 2F:
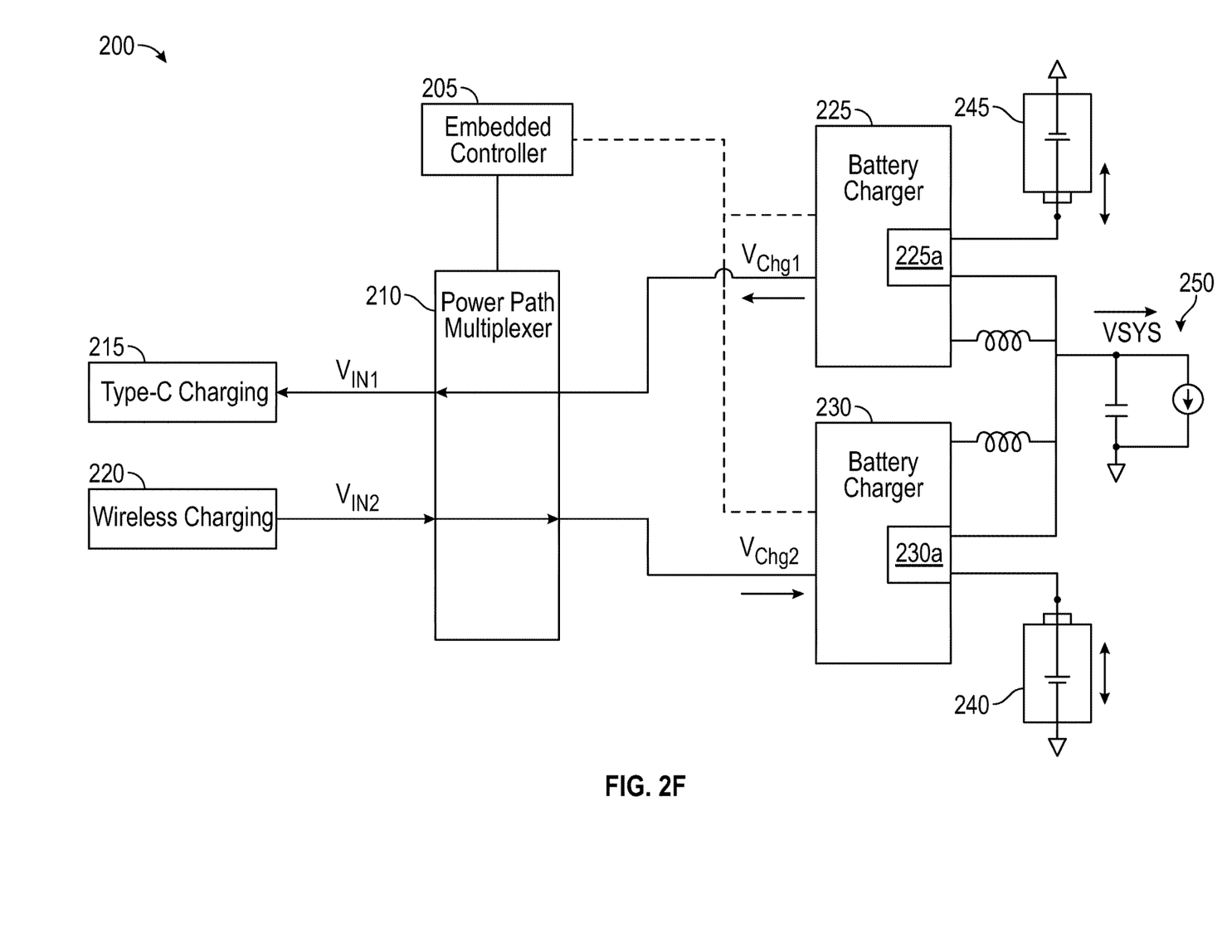
FIG. 2f is a block diagram illustrating certain components of a system in a sixth configuration for charging and powering an IHS that includes two batteries and two separate battery charging systems.
Figure 3:
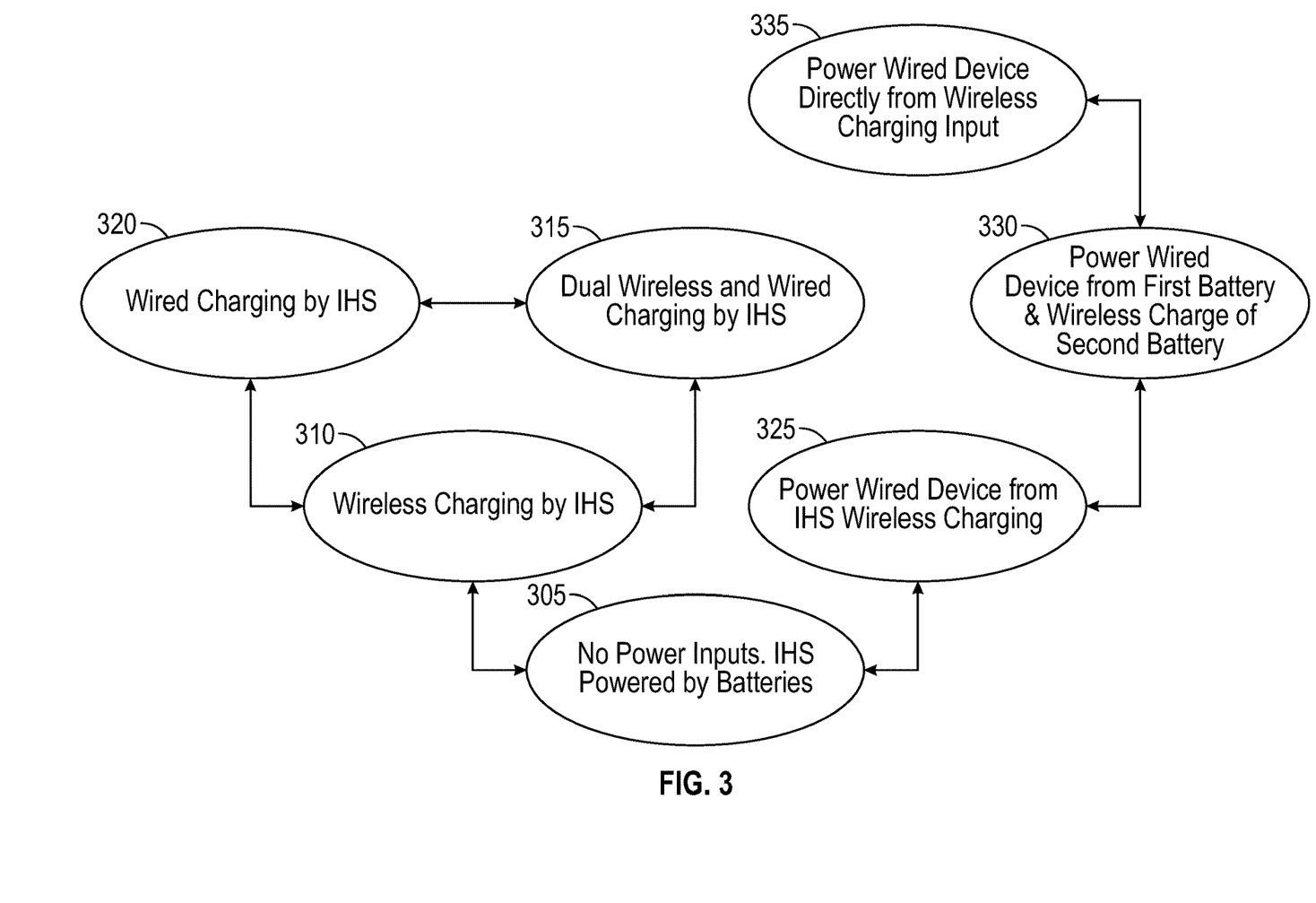
FIG. 3 is state diagram illustrating the various charging and power states supported by a system configured according to various embodiments.

FIG. 3 is a diagram depicting various states of the charging and power system 200 described with regard to FIGS. 2a-f. State 305 of FIG. 3 corresponds to the configuration of FIG. 2a in which no power couplings are connected to the charging and power system 200 and the batteries 240, 245 are discharged in order to provide system power 250. From this configuration, the wireless charging system 100 described with regard to FIG. 1 may be activated and may thus be an available wireless charging power coupling 220 in system 200. Accordingly, the charging power system 200 moves from state 305 to state 310, in which wireless charging is utilized.

FIG. 2b depicts the charging and power system 200 now configured by the embedded controller 205 for charging batteries 240 and 245 using wireless coupling 220. As illustrated, the voltage input ($V_{IN2}$) provided via the wireless coupling 220 is routed by the power path multiplexer 210 to both battery chargers 225 and 230 for simultaneous charging of both batteries 240 and 245 using the wireless charging voltage input. In this configuration, the wireless charging voltage input is used to simultaneously charge batteries 240 and 245, while the system voltage 250 is provided by concurrent discharge of batteries 240 and 245.

As indicated in FIG. 3, the charging and power system 200 may transition from wireless charging of state 310 to a wired charging state 320, such as illustrated in FIG. 2c. Upon detecting the transition from wireless charging to power inputs via the Type C power coupling 215, the embedded controller 205 may reconfigure the power path multiplexer 210 to route the voltage input ($V_{IN1}$) provided via the Type C power coupling 215 to both battery chargers 225 and 230 for simultaneous charging of both batteries 240 and 245, similar to the routing of wireless voltage inputs in FIG. 2b. Accordingly, the Type C charging voltage input may be used to simultaneously charge batteries 240 and 245, while the system voltage 250 is provided by concurrent discharge of batteries 240 and 245.

In certain scenarios, the charging and power system 200 may transition to state 315 based on the availability a voltage input ($V_{IN2}$) via the wireless power coupling 220. In such scenarios, the charging a power system now has voltage inputs available from both the Type C power coupling 215 and the wireless charging power coupling 220. As illustrated in FIG. 2d, the embedded controller 205 may detect such power availability conditions and may configure the power path multiplexer 210 to route each of the available voltage inputs to one of the two battery chargers 225 and 230.

For instance, the power path multiplexer 210 may be configured to route the Type C voltage input ($V_{IN1}$) on path 255a to battery charger 225 for use in charging battery 245. The power path multiplexer 210 may be further configured to route the wireless voltage input ($V_{IN2}$) on path 255b to battery charger 230 for use in charging battery 240. As illustrated, the power path multiplexer 210 may instead be configured to route Type C voltage input ($V_{IN1}$) on path 260a to battery charger 230 and to route wireless voltage input ($V_{IN2}$) on path 260b to battery charger 225. In this manner, the power path multiplexer 210 may support dual voltage inputs and concurrent, but separate, charging of both batteries 240 and 245.

In certain embodiments, the embedded controller 205 may be configured to monitor the charge levels of batteries 240 and 245 via queries to the respective battery chargers 230 and 225. Based on such battery level readings, the embedded controller 205 may reconfigure the power path multiplexer 210 to switch between the two dual routing configurations 255a-b and 260a-b. For instance, the embedded controller 205 may select the routing configurations 255a-b or 260a-b in order to route the highest available voltage input, $V_{IN1}$ or $V_{IN2}$, to the battery 240 or 245 that has the lower charge level. Through such configuration selections, the charging and power system 200 may seek to use the largest available input voltage in order to charge of the battery 240 or 245 that is closest to reaching a dead battery state.

In certain embodiments, the embedded controller 205 may be configured to remain in state 315 and thus utilize the dual routing configurations 255a-b and 260a-b as long as the wireless charging voltage input ($V_{IN2}$) is less than the Type C voltage input ($V_{IN1}$) and greater than one half of the Type C voltage input ($V_{IN1}$). In such configurations, the wireless charging voltage input ($V_{IN2}$) is lower than the Type C voltage input ($V_{IN1}$), but still large enough to effectively charge one of the batteries 240 or 245.

In scenarios where a voltage input is provided by both the wireless coupling 220 and the Type C coupling 215, the embedded controller 205 may be configured to detect when one of these voltage inputs drops below a threshold level. For instance, in the described scenario where the power path multiplexer 210 switches between the dual routing configurations as long as the $V_{IN2}$ is less than $V_{IN1}$ and greater than one half $V_{IN1}$, the embedded controller 205 may detect when the wireless voltage input ($V_{IN2}$) drops below one half the Type C voltage input ($V_{IN1}$). In such scenarios, the low wireless voltage input may be result less efficient charging of batteries 240 and 245 when compared to charging that utilizes only the significantly higher Type C voltage input. Accordingly, the embedded controller 205 may configure the power path multiplexer 210 to disconnect the low-voltage wireless voltage input ($V_{IN2}$) and to route the higher Type C voltage ($V_{IN1}$) for simultaneous charging of both batteries 240 and 245, similar to the configuration of FIG. 2c.

As described, a Type C power coupling 215 may support either providing the system 200 with a voltage input ($V_{IN1}$) or drawing power from system 200 for powering or charging a device connected to the Type C power coupling. Accordingly, the embedded controller 205 may detect the connection of a device to a Type C power port and a request for configuration of the Type C power coupling 215 for drawing power from system 200. In such scenarios, the charging and power system may transition to state 325 at which power is provided by the charging and power system 200 to the Type C for coupling 215 for powering or charging the device connected to the Type C power port.

As illustrated in FIG. 2e, in such scenarios, the power path multiplexer 210 may be configured to route power drawn from battery 245, via battery charger 225, to the Type C power coupling 215. In such embodiments, the embedded controller 205 may configure the battery charger 225 to draw a voltage from battery 245 that corresponds to the voltage for which the Type C power coupling 215 has been configured, as determined by the embedded controller 205. In this manner, the charging and power system 200 may be configured to serve as a power source for a device connected to the Type C power coupling 215.

FIG. 2f depicts a scenario in which a wireless charging coupling 220 is now available as a voltage input ($V_{IN2}$), thus transitioning to state 330 of FIG. 3. Upon detecting the wireless charging voltage input, the embedded controller 205 may configure the power path multiplexer 210 to continue providing a power output via the Type C power coupling 215 and to route the voltage input from the wireless charging coupling 220 to the battery charger 230 associated with battery 240. In this configuration, the system 200 simultaneously charges one battery and discharges another battery to provide output power via the Type C power coupling 215.

In certain embodiments, the embedded controller 205 may monitor the system load 250 and the power output being supported via the Type C power coupling 215 in order to determine whether one or both of the batteries 240 and 245 may be charged using the wireless charging voltage input ($V_{IN2}$). For instance, in scenarios where the wireless charging voltage input ($V_{IN2}$) is greater than the sum of the system voltage 250 and the voltage drawn to provide power via the Type C power coupling 215, the wireless charging voltage input ($V_{IN2}$) may be used to charge both batteries 240 and 245. In certain embodiments, this determination by the embedded controller may also account for the inefficiency of the battery charger 225 in converting power drawn from battery 245 to the voltage provided via the Type C power coupling 215. In scenarios where the wireless charging voltage input ($V_{IN2}$) is not sufficient to power both the system 250 and the Type C power coupling 215, the wireless charging voltage input ($V_{IN2}$) may be restricted for charging battery 240, while battery 245 is discharged to provide power to the Type C power coupling 215.

Figure 2G:
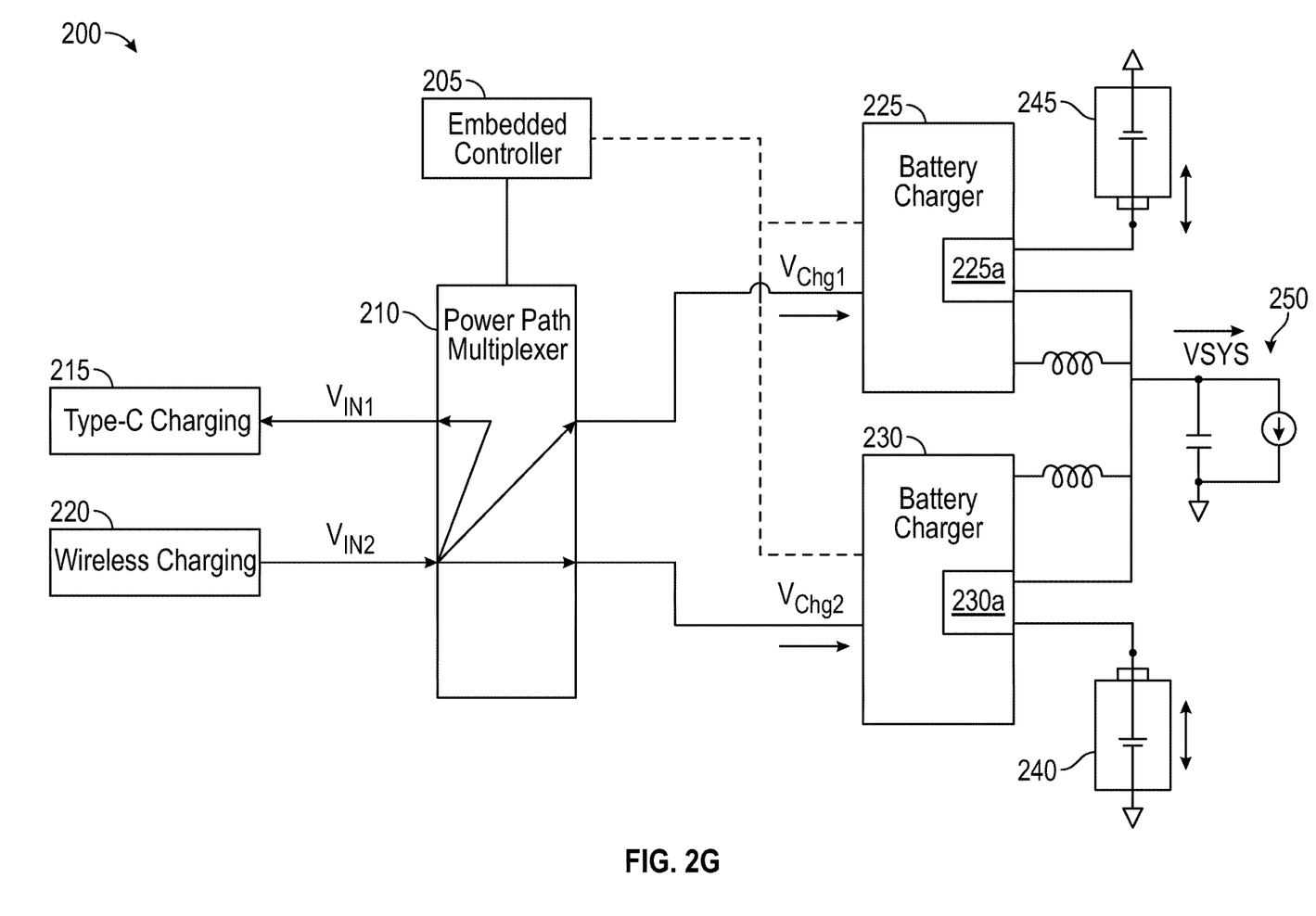
FIG. 2g is a block diagram illustrating certain components of a system in an eighth configuration for charging and powering an IHS that includes two batteries and two separate battery charging systems.

In FIG. 2f, power is provided via the Type C power coupling 215 to an attached device through the discharge of battery 245 and the generation of Type C output voltage by battery charger 225. As provided, the generation of the output voltage by battery charger 225 includes inefficiencies that result in a certain portion of the discharge of battery 245 being lost as heat rather than being converted to an output voltage. FIG. 2g illustrates a configuration of the charging and power system 200, corresponding to state 335 of FIG. 3, that avoids such inefficiencies while supporting dual power couplings, one of which provides a power output via the Type C power coupling 215.

As illustrated in FIG. 2g, the embedded controller 205 may configure the power path multiplexer 210 to route the wireless charging voltage input ($V_{IN2}$) directly to the Type C power coupling 215. In scenarios where the wireless charging voltage input ($V_{IN2}$) is large enough to provide the power required by the Type C power coupling 215 and to also provide the system power 250, the wireless charging voltage input ($V_{IN2}$) in excess of the voltage output of the Type C power coupling 215 may be routed to the battery chargers 230 and 225 for charging of batteries 240 and 245, as reflected in FIG. 2g. In scenarios where the wireless charging voltage input ($V_{IN2}$) is insufficient to power the system 250 and the output of the Type C power coupling 215, the batteries 240 and 245 may instead be discharged to power the system 250 and the wireless charging voltage input ($V_{IN2}$) may be directed to supporting the output of the Type C power coupling 215.

By routing the wireless charging voltage input ($V_{IN2}$) directly to the Type C power coupling 215, the power path multiplexer 210 avoids the inefficiency of generating the output voltage of the Type C power coupling 215 via the battery charger 225. However, in certain scenarios, the wireless charging voltage input ($V_{IN2}$) may not match the required voltage of the Type C power coupling 215. The embedded controller 205 may interface with the Type C connection controller in order to negotiate the power output that may be provided via the Type C power coupling 215 in light of the available wireless charging voltage input ($V_{IN2}$). In order to provide the output power of the Type C power coupling 215 at the negotiated voltage, the power path multiplexer 210 may include a voltage regulator that may be configured by the embedded controller 205 to generate negotiated Type C voltage.

In certain embodiments, the embedded controller 205 may detect conditions that preclude the system 200 from providing a power output via the Type C power coupling 215. Even though such conditions require termination of the Type C power coupling 215 power output, terminating this power output abruptly may result in damage to a device relying on the power output of the Type C power coupling 215. Accordingly, the embedded controller 205 may temporarily configure the power path multiplexer 210 to route power from battery 245 that is sufficient to supplement the wireless charging voltage input ($V_{IN2}$) such that the required Type C power coupling 215 output power may be provided by the system 200 until the embedded controller 205 successfully negotiates termination of the Type C power output with the Type C connection controller.

In the embodiments described above, dual charging and power draws are supported in systems that utilize two separate batteries, each with its own charging system. In certain additional embodiments, similar dual charging and power draws may be supported for separate banks of battery cells comprised within a single multi-cell battery, where the separate banks may be configured to utilize separate battery chargers. In certain of such embodiments the battery cells supported by a particular battery charger may be reconfigured. In embodiments utilizing a single multi-cell battery, the multi-cell battery in the various chargers supporting the different banks of cells in the multi-cell battery may be incorporated into the chassis base portion of the IHS. As described with regard to the above embodiments, the embedded controller may configure the power path multiplexer to route power to and from the different battery chargers. However, in single multi-cell battery embodiments, each battery charger is configured to charge and drop power from a portion of the battery cells.

As described with regard to FIG. 1, embodiments may be implemented via a 2-in-1 type laptop computer. Such IHSs may be configured in various postures that allow the IHS to be utilized as a conventional laptop, a tablet, or various other hybrid configurations, such as a dual screen display operable through a wireless keyboard and mouse. Also as described with regard to FIG. 1, wireless charging of an IHS may be supported by placing the IHS at a specific location and with a specific orientation on a wireless charging pad. Consequently, wireless charging of an IHS may not be supported in all postures, regardless of the proximity of the IHS to the wireless charging pad. In certain embodiments, the embedded controller 205 may be configured to detect changes in the posture of the IHS and may reconfigure the power path multiplexer 210 accordingly. For instance, upon detecting that the IHS has been configured as a tablet device, the power path multiplexer 210 may be configured to disable wireless charging voltage inputs.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a first battery system;
   a second battery system;
   a first power coupling;
   a second power coupling; and
   a power path multiplexer connected to the first power coupling and the second power coupling, wherein the power path multiplexer is configured to:
      route power inputs received concurrently via the first power coupling and the second power coupling for charging the first battery system or the second battery system; and
      route power inputs received via the first power coupling for powering a device connected to the second power coupling.

2. The IHS of claim 1, wherein the first battery system comprises a rechargeable first battery and a first battery charger and wherein the second battery system comprises a rechargeable second battery and a second battery charger.

3. The IHS of claim 2, wherein the power path multiplexer is further configured to route power inputs received concurrently via the first power coupling and the second power coupling for charging the lowest charged of the first battery and the second battery.

4. The IHS of claim 1, wherein the first power coupling provides a wireless charging power input to the power path multiplexer.

5. The IHS of claim 1, wherein the second power coupling comprises a wired power coupling operable to provide a power input to the power path multiplexer or to draw a power output provided by the power path multiplexer.

6. The IHS of claim 1, wherein the first battery system is comprised within a chassis base portion of the IHS.

7. The IHS of claim 6, wherein the second battery system is comprised within a display portion of the IHS.

8. The IHS of claim 1, further comprising:
   an embedded controller operable to:
      detect a voltage input available via the first power coupling;
      detect a voltage output request via the second power coupling;
      configure the power path multiplexer to route the first power coupling voltage input to the second power coupling.

9. A method for managing power inputs available to an Information Handling System (IHS), the method comprising:
   receiving a first power input via a first power coupling to the IHS;
   receiving, concurrent with the first power input, a second power input via a second power coupling to the IHS;
   routing, by a power path multiplexer of the IHS, the first power input and the second power input for charging a first battery system of the IHS or for charging a second battery system of the IHS; and
   routing, by the power path multiplexer, the first power input for powering a device connected to the second power coupling.

10. The method of claim 9, wherein the first battery system comprises a rechargeable first battery and a first battery charger and wherein the second battery system comprises a rechargeable second battery and a second battery charger.

11. The method of claim 10, wherein the concurrently received power inputs are routed by the power path multiplexer for charging the lowest charged of the first battery and the second battery.

12. The method of claim 9, wherein the first power coupling provides a wireless charging power input to the power path multiplexer.

13. The method of claim 9, wherein the second power coupling comprises a wired power coupling operable to provide a power input to the power path multiplexer or to draw a power output provided by the power path multiplexer.

14. The method of claim 9, wherein the first battery system is comprised within a chassis base portion of the IHS.

15. The method of claim 14, wherein the second battery system is comprised within a display portion of the IHS.

16. The method of claim 9, further comprising:
   detecting, by an embedded controller of the IHS, a voltage input available via the first power coupling;
   detecting, by the embedded controller, a voltage output request via the second power coupling; and
   configuring, by the embedded controller, the power path multiplexer to route the first power coupling voltage input to the second power coupling.

17. A system for powering and charging an Information Handling System (IHS), the system comprising:
   a multi-cell battery comprising a plurality of cells, wherein a first portion of the plurality of cells are configured for charging via a first charger of the IHS and a second portion of the plurality of cells are configured for charging via a second charger of the IHS;
   a first power coupling;
   a second power coupling; and a power path multiplexer connected to the first power coupling and the second power coupling, wherein the power path multiplexer is configured to:
  route power inputs received concurrently via the first power coupling and the second power coupling for charging the first portion of the plurality of battery cells or for charging the second portion of the plurality of battery cells; and
  route power inputs received via the first power coupling for powering a device connected to the second power coupling.

18. The system of claim 17, wherein the power path multiplexer is further configured to route power inputs received concurrently via the first power coupling and the second power coupling for charging the lowest charged of the first portion of the plurality of battery cells and the second portion of the plurality of battery cells.

19. The system of claim 17, wherein the first power coupling provides a wireless charging power input to the power path multiplexer.

20. The system of claim 17, wherein the second power coupling comprises a wired power coupling operable to provide a power input to the power path multiplexer or to draw a power output provided by the power path multiplexer.

* * * * *